Patented Oct. 7, 1924.

1,510,810

UNITED STATES PATENT OFFICE.

JACOB REIN NICOLAAS VAN KREGTEN, OF ARNHEM, NETHERLANDS, ASSIGNOR TO NAAMLOOZE VENNOOTSCHAP NEDERLANDSCHE KUNSTZIJDEFABRIEK, OF ARNHEM, NETHERLANDS.

METHOD OF PURIFYING SOLUTIONS OF VISCOSE AND SIMILAR SOLUTIONS OF CELLULOSE.

No Drawing.   Application filed November 13, 1922.   Serial No. 600,666.

*To all whom it may concern:*

Be it known that I, JACOB REIN NICOLAAS VAN KREGTEN, a subject of the Queen of the Netherlands, residing at Arnhem, Province of Gelderland, Kingdom of the Netherlands, have invented certain new and useful Improvements in or Relating to Methods of Purifying Solutions of Viscose and Similar Solutions of Cellulose, of which the following is a specification.

It is well known that the purifying of viscose and similar solutions of cellulose, which are used for the spinning of artificial silk and other artificial textile products, presents many difficulties. For obtaining a good spinning solution it is absolutely necessary to purify the raw viscose, obtained by dissolving the cellulose xanthate, by completely removing all dirt such as non-attacked fibres of cellulose, or other foreign matter which might obstruct the very fine spinning openings during the spinning operation and thus interfere with the uniformity of the process.

Generally, the cellulose solution is filtered in a filter-press, the operation being repeated once or more often if required. Frequently, however, this filtration is not sufficient because the very finest particles easily pass through the filter.

The present invention for purifying viscose and similar solutions of cellulose consists in emulsifying intensely the solution with an organic liquid which does not dissolve therein. The impurities are now partly dissolved in the organic liquid, partly captured by it. When the emulsion is allowed to settle, the added organic liquid separates slowly from the cellulose solution. Two layers of liquid are thereby obtained; the layer of organic liquid containing the impurities partly in solution and partly in suspension therein, the suspended particles being disposed near the boundary between the said layer of organic liquid and the viscose layer, which latter is quite free from dirt and much less coloured than before.

A much accelerated separation of the two liquids may be obtained by action of centrifugal force. The organic liquid then separates very easily and quickly and the purified viscose may be collected easily. By using separators the separation may be made a continual process.

The following advantages of the new process may be cited:

Filter presses are eliminated;

A much purer viscose is obtained than was previously possible;

Substances such as resins (which may originate from the used cellulose) are removed.

The following example illustrates the invention:

100 kilos of viscose are intensely emulsified in a mixing machine with 10 kilos of paraffin oil; the emulsion is then centrifuged.

The separated, purified viscose is spun in the usual manner.

Of course it is possible to use another organic liquid, provided that it does not dissolve in the viscose. The method has also the advantage that the organic liquid may be regenerated easily to a very large extent.

What I claim is:

1. A method of purifying viscose and similar solutions of cellulose, comprising emulsifying the cellulose solution with an organic liquid which does not dissolve therein, whereby the impurities contained in said solution will be partly dissolved by the organic liquid and will partly remain in suspension in that liquid; and then separating the purified cellulose solution from the organic liquid.

2. A method of purifying viscose and similar solutions of cellulose, comprising emulsifying the cellulose solution with paraffin oil, whereby the impurities contained in said solution will be partly dissolved by the oil but for the most part will remain in suspension in the oil; and then separating the purified cellulose solution from the paraffin oil.

3. A method of purifying viscose and similar solutions of cellulose, comprising emulsifying the cellulose solution with an organic liquid which does not dissolve therein, whereby the impurities contained in said solution will be partly dissolved by the organic liquid and will partly remain in suspension in that liquid; and then subjecting the emulsion to the action of centrifugal force, to separate the purified cellulose solution from the organic liquid containing the impurities.

In testimony whereof I affix my signature.

Dr. JACOB REIN NICOLAAS van KREGTEN.